US008318329B2

(12) United States Patent
Silmy et al.

(10) Patent No.: US 8,318,329 B2
(45) Date of Patent: Nov. 27, 2012

(54) RADIATION-SELECTIVE ABSORBER COATING, ABSORBER TUBE AND PROCESS FOR PRODUCTION THEREOF

(75) Inventors: Kamel Silmy, Mitterteich (DE); Jan Schulte-Fischedick, Waldershof (DE); Thomas Kuckelkorn, Jena (DE); Christina Hildebrandt, Freiburg (DE); Wolfgang Graf, Eschbach (DE); Andreas Georg, Freiburg (DE)

(73) Assignee: Schott AG, Mainz (DE)

( * ) Notice: Subject to any disclaimer, the term of this patent is extended or adjusted under 35 U.S.C. 154(b) by 603 days.

(21) Appl. No.: 12/372,070

(22) Filed: Feb. 17, 2009

(65) Prior Publication Data
US 2009/0208761 A1    Aug. 20, 2009

(30) Foreign Application Priority Data
Feb. 20, 2008    (DE) .......................... 10 2008 010 199

(51) Int. Cl.
*B32B 15/04*    (2006.01)
*C23C 14/10*    (2006.01)

(52) U.S. Cl. ..................... 428/701; 428/469; 428/472.2; 428/699; 428/702; 427/255.15; 427/255.18; 427/255.19; 204/192.1

(58) Field of Classification Search ............... 428/701, 428/702, 469, 472.2, 688, 689, 699; 252/582; 427/255.15, 255.18, 255.19, 255.22, 255.27, 427/255.37, 255.7; 204/192.1
See application file for complete search history.

(56) References Cited

U.S. PATENT DOCUMENTS

| 5,523,132 | A  | * | 6/1996  | Zhang et al. ................ 428/34.4 |
| 5,965,246 | A  | * | 10/1999 | Guiselin et al. ............. 428/212 |
| 6,045,896 | A  | * | 4/2000  | Boire et al. ................. 428/216 |
| 6,632,542 | B1 | * | 10/2003 | Mahoney et al. ............ 428/632 |
| 7,793,653 | B2 |   | 9/2010  | Kuckelkorn et al. |

(Continued)

FOREIGN PATENT DOCUMENTS
CN    1512119    7/2004
(Continued)

OTHER PUBLICATIONS

Michael Lanxner et al: "Solar Selective Absorber Coating for High Services . . . " SPIE vol. 1272 Optical Materials Technology for Energy Efficiency and Solar Energy Conversion IX, 1990, pp. 240-249 (In Eng.).

(Continued)

*Primary Examiner* — Jennifer McNeil
*Assistant Examiner* — Lauren Robinson
(74) *Attorney, Agent, or Firm* — Michael J. Striker

(57) ABSTRACT

The radiation-selective absorber coating (20) has two barrier layers (24a, 24b), an IR-reflecting layer (21) arranged thereon, an absorption layer (22) arranged above the IR-reflecting (21) and an antireflection layer (23) over the absorption layer (22). The absorber tube (13) is a steel tube (1) with the radiation-selective absorber coating (20) applied to the outside thereof. In the process of coating the absorber tube (13) a first oxide barrier layer (24a) is applied to a steel tube by thermal oxidation; a second barrier layer (24b) is then applied by physical gas phase deposition of silicon with supply of oxygen; the IR-reflecting layer (21) is then applied by gas phase deposition of gold, silver, platinum or copper; the absorption layer (22) is then applied by deposition of aluminum and molybdenum; and a final antireflection layer (23) is applied by deposition of silicon with supply of oxygen.

23 Claims, 2 Drawing Sheets

U.S. PATENT DOCUMENTS

| | | | |
|---|---|---|---|
| 2004/0147185 A1* | 7/2004 | Decroupet | 442/59 |
| 2005/0189525 A1* | 9/2005 | Kuckelkorn et al. | 252/582 |
| 2006/0141265 A1* | 6/2006 | Russo et al. | 428/426 |
| 2007/0235023 A1* | 10/2007 | Kuckelkorn et al. | 126/652 |
| 2007/0281171 A1* | 12/2007 | Coster et al. | 428/432 |
| 2008/0121225 A1* | 5/2008 | Kuckelkorn et al. | 126/635 |
| 2008/0311389 A1* | 12/2008 | Roquiny et al. | 428/336 |
| 2009/0208761 A1 | 8/2009 | Silmy et al. | |

FOREIGN PATENT DOCUMENTS

| | | |
|---|---|---|
| CN | 1670446 | 9/2005 |
| DE | 28 11 393 | 9/1979 |
| DE | 101 50 738 | 5/2003 |
| DE | 10 2004 010 689 | 6/2005 |
| DE | 10 2004 060 982 | 11/2006 |
| DE | 20 2006 009 369 | 11/2007 |
| DE | 10 2006 056 536 | 2/2008 |
| DE | 10 2008 010 199 | 8/2009 |
| WO | 2005/010225 | 2/2005 |

OTHER PUBLICATIONS

C.E Kennedy: "Review of Mid- to High-Temperature . . . " Jul. 2002, National Renewable Enegy Laboratory. Golden. CO, pp. 1-53 (In Eng.).

\* cited by examiner

RADIATION-SELECTIVE ABSORBER COATING, ABSORBER TUBE AND PROCESS FOR PRODUCTION THEREOF

CROSS-REFERENCE

The disclosure of German Patent Application DE 10 2008 010 199.0-15, filed on Feb. 20, 2008 in Germany, is expressly incorporated herein by reference thereto. This German Patent application also describes the same invention that is described herein below and provides the basis for a claim of priority of invention under 35 U.S.C. 119 (a) to (d).

U.S. patent application Ser. No. 12/903,625, filed on Oct. 13, 2010, and U.S. patent application Ser. No. 12/780,007, filed on May 14, 2010, also disclose and claim radiation-selective absorber coatings for solar power generating applications, which may be related to the radiation-selective absorber coatings disclosed and claimed in the following specification.

BACKGROUND OF THE INVENTION

1. The Field of the Invention

The invention relates to a radiation-selective absorber coating, especially for an absorber tube of a parabolic collector. The invention also relates to an absorber tube with such a radiation-selective coating. The invention also relates to a process for producing it and to a process for operating a parabolic collector using such absorber tubes.

2. The Description of the Related Art

Customary absorber coatings consist of a layer which reflects in the infrared region and is applied to a substrate, especially a metal tube, a cermet layer which possesses a high level of absorption in the region of the solar spectrum, and a top layer which is applied to the cermet layer, is referred to as an antireflection layer and, owing to the high refractive index of the cermet layer, is intended to reduce surface reflection on the cermet layer.

The fundamental aim is to achieve a maximum energy yield. Since the energy yield depends, among other factors, on the absorption coefficient $\alpha$ and the emission coefficient $\epsilon$, the aim is always a high absorption ($\alpha > 95\%$) and a low emission ($\epsilon < 10\%$) of the absorber coating.

In addition, the efficiency of the collector is determined by the temperature at which it is operated. From this point of view, a maximum temperature is desired. Contrary to this, the lifetime of the layer system of the absorber coating, however, decreases with increasing operating temperature owing to ageing and/or diffusion processes, as a result of which, for example, the absorption property of the cermet layer and the reflection property of the layer which reflects in the infrared range can decline significantly.

DE 101 50 738 C1 therefore describes a radiation-selective absorber coating which is said not to exhibit any relevant color change and hence any ageing. This is achieved by virtue of a particular oxygen volume flow being established in the course of application of a third layer consisting of aluminium and aluminium oxide. A final layer of $Al_2O_3$ is applied to this layer.

U.S. Pat. No. 5,523,132 discloses an absorber coating in which a plurality of cermet layers are provided, which differ in the metal content and hence in the refractive index. By virtue of a plurality of absorption maxima being created at different wavelengths, a better match to the solar spectrum should be achieved. Anti-diffusion layers can be provided between the cermet layer and the layer which reflects in the IR region or between the cermet layer and the antireflection layer, though no statements are made about material and layer thickness.

DE 10 2004 010 689 B3 discloses an absorber comprising a radiation-selective absorber coating which comprises a metal substrate, a diffusion barrier layer, a metal reflection layer, a cermet layer and an antireflection layer. The diffusion barrier layer is an oxide layer which consists of oxidized components of the metal substrate.

Michael Lanxner and Zvi Elgat in SPIE Vol. 1272 Optical Materials Technology for Energy Efficiency and Solar Energy Conversion IX (1990), page 240 to 249, with the title "Solar selective absorber coating for high service temperatures, produced by plasma sputtering" describe an absorber coating which is applied to a steel substrate and comprises an antireflection layer of $SiO_2$, a cermet layer composed of an $Mo/Al_2O_3$ composition and a layer of molybdenum which reflects in the infrared region, a diffusion barrier of $Al_2O_3$ being arranged between the layer which reflects in the infrared region and the substrate.

For the layers which reflect in the infrared region, molybdenum is typically used. However, the reflection properties of a molybdenum layer are not optimal, and so it is desirable to use better-reflecting materials.

The operating temperature range of known absorber tubes is from 300 to 400° C. under reduced pressure. For the reasons above, there is a fundamental drive to further increase the operating temperature, but without impairing, for example, the absorption properties of the cermet layer and the reflection properties of the layer which reflects in the infrared region.

C. E. Kennedy, "Review of Mid- to High-Temperature Solar Selective Absorber Materials", Technical Report of the National Renewable Energy Laboratory, July 2002 edition, summarizes such efforts. This discloses a layer structure composed of a $ZrO_xN_y$ or $ZrC_xN_y$ absorption layer and a layer of Ag or Al which reflects in the IR region, which, by virtue of introduction of an $Al_2O_3$ diffusion barrier layer, has an improved thermal stability under air. In addition, it has been found that the thermal stability of the infrared reflection layer under reduced pressure can be improved by introducing a diffusion barrier layer below this layer. For this barrier layer, $Cr_2O_3$, $Al_2O_3$ or $SiO_2$ are proposed as the layer material. It is hoped that this will achieve stability of the silver reflection layer up to 500° C.

However, this does not put an end to the drive toward more durable layers with simultaneously improved absorption and emission.

SUMMARY OF THE INVENTION

In this context, it is an object of the present invention to provide an absorber coating, an absorber tube with such a coating and a parabolic collector in which such an absorber tube is used, which can be operated more economically viably over a prolonged period.

This object is achieved by virtue of a layer which reflects in the infrared region and which is arranged on at least two barrier layers, of which the second barrier layer consists of a $SiO_x$ compound.

It has been found that, surprisingly, the screening of the layer which reflects in the IR region from the substrate by a two-layer barrier more effectively prevents diffusion, especially thermal diffusion, of the substrate material, especially of iron, from the steel absorber tube into the layer which reflects in the IR region, hence increasing the long-term thermal stability of the coating.

This is very successful especially when a first barrier layer of the at least two barrier layers consists of an oxide obtained thermally and a second barrier layer of the at least two barrier layers consists of a $SiO_x$ compound in which x may assume the values of 1 to 2. More preferably, x=2, but values between 1 and 2 are also possible.

Preferably, a third barrier layer is arranged between the layer which reflects in the IR region and the absorption layer which advantageously consists of cermet, and preferably consists of an $Al_xO_y$ compound where x may assume the values 1 to 2 and y the values of 1 to 3. Alternatively, a third barrier layer composed of an $SiO_x$ layer is preferred, where x may assume the values of 1 to 2 and preferably assumes the value of 2, but values between 1 and 2 are also possible.

The embedding of the layer which reflects in the infrared region between two silicon layers or one silicon layer and one aluminium oxide layer and the associated formation of a sandwich has the advantage that it is also impossible for any material from the layer which reflects in the infrared region to diffuse into the absorption layer above it, and in this way to impair the absorption properties of the absorption layer. The substantial suppression of diffusion within the layer system, especially into or out of the layer which reflects in the IR region, and into the cermet absorption layer, can thus be ensured.

In this way, it is possible for the first time to detect a high absorption with $\alpha > 95.5\%$ and a low emission with $\epsilon < 8.5\%$ at an operating temperature of 550° C. under reduced pressure over a period of 600 hours. This allows the efficiency of a collector comprising an absorber tube provided with this coating to be improved from two points of view: the improved selectivity ratio $\alpha/\epsilon > 0.95/0.1$ means a higher yield of the radiative energy, and an elevated operating temperature enables more efficient conversion to electrical energy, given that it is only the long lifetime of such a coating that ensures the economic operation of a corresponding parabolic collector comprising absorber tubes coated in this way.

This is because the high thermal stability of the absorber coating allows the use of inexpensive heat carrier media. To date, expensive specialty oils have been used as heat carrier fluid, which are thermally stable only up to approx. 400° C. The high thermal stability of the absorber coating now allows operating temperatures for the absorber tubes of 400° C. up to 550° C.

It is advantageously possible to use a heat carrier medium with a boiling point of <110° C., especially water. At such high operating temperatures, steam which can be introduced directly into steam turbines forms. Additional heat exchangers for the transfer of the heat from the oil which has been used to date to water are no longer required, and so, from this point of view, parabolic collectors comprising absorber tubes with inventive absorber coating can be operated much more economically viably than has been the case to date.

A further advantage is that the flow rate of the heat carrier fluid through the absorber tubes can be lowered, since a higher operating temperature is permissible without disadvantages for the absorber tube coating. In this way, energy for operation of the pumps of a parabolic collector can be saved.

Preferably, the thickness of the silicon and aluminium oxide layers is between 5 nm and 100 nm. At thicknesses of <5 nm, according to the composition of the adjacent layers, the barrier action of the silicon or aluminium oxide layer is not satisfactory. At thicknesses greater than 100 nm, thermal stresses occur, which under some circumstances might lead to layer detachment. Preferably the thickness of the silicon oxide and aluminium oxide layers is between 15 nm and 70 nm, more preferably between 20 nm and 40 nm.

The thicknesses of the two silicon oxide and aluminium oxide layers may be different, the thickness of the lower silicon oxide layer preferably being greater than the thickness of the upper oxide layer. Preferably, the layer thickness of the silicon oxide layer which is arranged between the substrate and the layer which reflects in the IR region is 5 nm to 100 nm, preferably 15 nm to 70 nm, and the layer thickness of the aluminium oxide or silicon oxide layer which is arranged between the layer which reflects in the IR region and the absorption layer is 0 nm to 50 nm, and according to the composition of the layers, preferably 30 nm to 40 nm or else 5 nm to 15 nm.

The embedding of the layer which reflects in the infrared region between two oxide layers has the further advantage that materials such as silver, copper, platinum or gold can be used for this layer, these materials diffusing more easily but having the crucial advantage over molybdenum that they reflect significantly better in the infrared region, such that an emission $\epsilon$ of <10% is achievable.

The thickness of the layer which reflects in the infrared region, depending on the material, is preferably 50 nm to 250 nm. Within this thickness range, a layer thickness of 100 nm to 150 nm is preferred, when especially copper or silver is used. When silver is used, layer thicknesses in the range from 80 nm to 150 nm may also be preferred. In other cases, useful layer thicknesses are also 50 to 100 nm, especially 50 to 80 nm.

These low layer thicknesses for the layer which reflects in the infrared region are possible because the gold, silver, platinum and copper materials have a significantly higher reflectivity and cannot diffuse away into other layers as a result of the packing between two oxide layers or be impaired in terms of their positive properties as a result of other disruptive elements diffusing in.

The higher cost of the noble metals gold, silver and platinum can be compensated for, in some cases even overcompensated, by the significantly lower layer thickness compared to the known layer thicknesses for the layer which reflects in the infrared region.

The use of $SiO_x$ as the second barrier layer between substrate and infrared mirror coating is advantageous over the use of $Al_xO_y$, since only a thickness of approx. 30 nm compared to approx. 60 nm is then needed. This allows the processing times to be shortened and the throughput to be increased.

The thickness of the absorption layer is preferably 60 to 180 nm, more preferably 80 nm to 150 nm. The absorption layer is preferably a cermet layer of aluminium oxide comprising molybdenum or of zirconium oxide comprising molybdenum. Instead of a homogeneous absorption layer, it is also possible for a plurality of absorption layers of different composition to be provided, especially with decreasing metal content, or a gradually variable absorption layer. The cermet layer is preferably a gradient layer, which is understood to mean a layer in which the metal content increases or decreases continuously within the layer, but in practice also stepwise.

The layer thickness of the antireflection layer present on the absorption layer is preferably 60 to 120 nm. This layer preferably consists of silicon oxide or aluminium oxide.

The process according to the invention for producing an absorber tube is characterized by the following steps:
  applying a first oxide barrier layer to a steel tube by means of thermal oxidation,
  applying a second barrier layer by means of physical gas phase deposition (PVD) of silicon with supply of oxygen, applying a layer which reflects in the infrared region by means of physical gas phase deposition of materials as gold, silver, platinum or copper, preferably of gold, silver, platinum or copper applying an absorption layer by means of simultaneous physical gas phase deposition of aluminium and molybdenum, and applying an antireflection layer by means of physical gas phase deposition of silicon with supply of oxygen.

The steel tube is preferably polished before the thermal oxidation, preferably to a surface roughness of $R_a<0.2$ µm.

The inventive absorber tube, especially for a parabolic collector, comprising a steel tube on whose exterior is applied a radiation-selective absorber coating which comprises at least one layer which reflects in the infrared region, at least one absorption layer arranged above the reflecting layer and an antireflection layer arranged above the absorption layer is characterized in that at least two barrier layers are arranged between the steel tube and the reflecting layer, of which a first barrier layer applied to the steel tube consists of an oxide obtained thermally and a second barrier layer applied to the first barrier layer consists of a $SiO_x$ compound where x may assume the values of 1 to 2.

The absorber tube, especially for parabolic collectors, with a steel tube on whose exterior is applied a radiation-selective absorber coating at least comprising a layer which reflects in the IR region, comprising an absorption layer, especially of cermet material, and comprising an antireflection layer which is applied to the cermet layer, is especially characterized in that the layer which reflects in the infrared region is arranged between two $SiO_x$ layers or one $SiO_x$ layer and one $Al_yO_z$ layer, where x may preferably assume the value of 2, y may preferably assume the values of 1 to 2 and z may assume the values of 1 to 3.

The process according to the invention for operating a parabolic collector with absorber tubes through which a heat carrier medium is passed is characterized in that the absorber tubes are used with a radiation-selective absorber coating which comprises at least one layer which reflects in the infrared region, at least one absorption layer arranged above the reflecting layer and an antireflection layer arranged above the absorption layer, at least two barrier layers being arranged between the absorber tube and the reflecting layer, of which a first barrier layer facing toward the absorber tube consists of an oxide obtained thermally, and a second barrier layer applied to the first barrier layer consists of an $SiO_x$ compound where x may assume the values of 1 to 2.

The process for operating a parabolic collector with absorber tubes through which a heat carrier medium is passed is especially characterized in that absorber tubes are used with a radiation-selective absorber coating which comprises at least one layer which reflects in the infrared region, an absorption layer, especially of cermet material, and an antireflection layer, said layer which reflects in the infrared region being arranged between two $SiO_x$ layers or one $SiO_x$ layer and one $Al_yO_z$ layer, where x may preferably assume the value of 2, y may preferably assume the values of 1 to 2 and z may assume the values of 1 to 3.

The heat carrier fluid used may especially be water, or else oil or liquid salt.

In a further embodiment, the process for operating a parabolic collector envisages that the operating temperature of the absorber tube is adjusted to 400° C. to 550° C., especially to 480° C. to 520° C.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
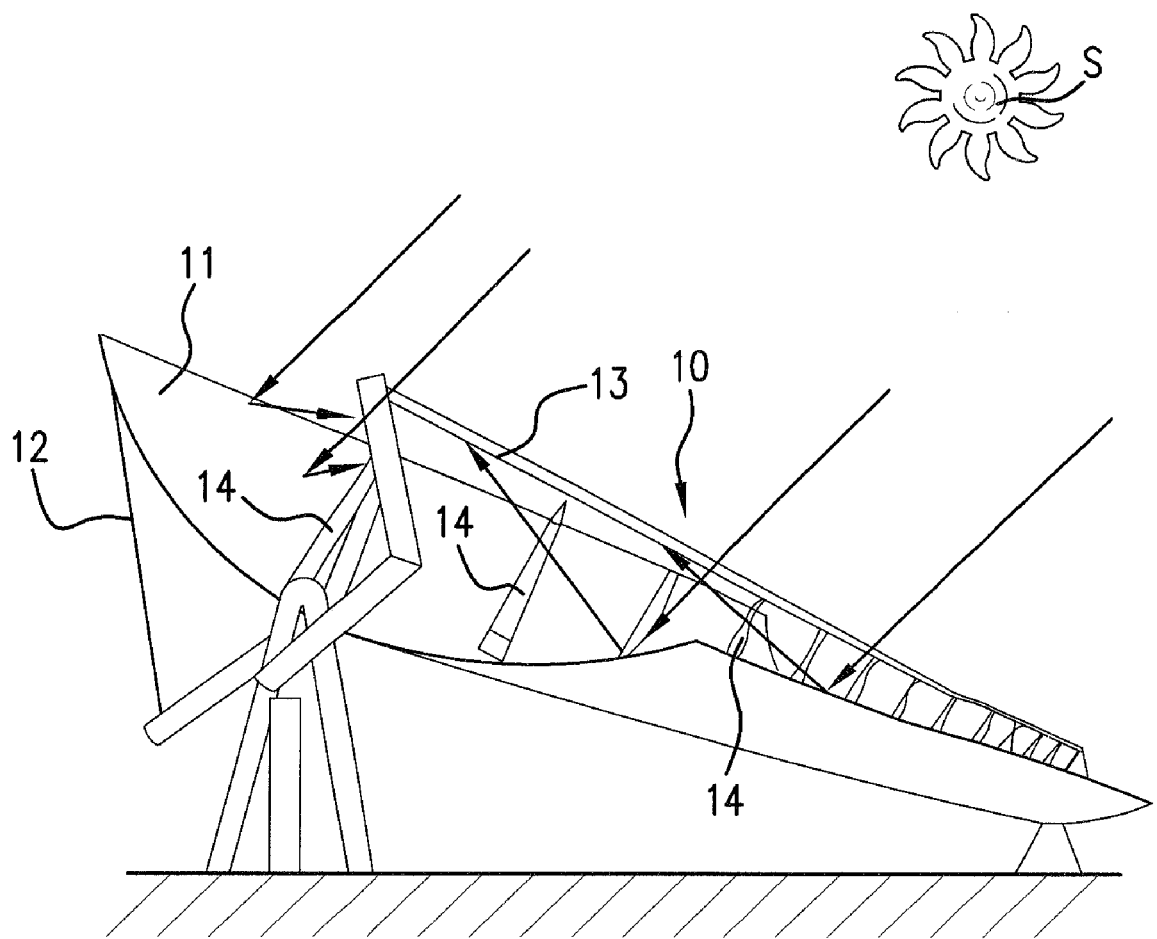
FIG. 1 is a perspective view of a parabolic collector including an absorber tube.

FIG. 1 shows a parabolic collector 10 which has an elongated parabolic reflector 11 with a parabolic profile. The parabolic reflector 11 is held by a support structure 12. Along the focal line of the parabolic reflector 11 there extends an absorber tube 13 which is secured on supports 14 which are connected to the parabolic collector. The parabolic reflector 11 together with the supports 14 and the absorber tube 13 forms a unit which is rotated about the axis of the absorber tube 13, thus tracking the position of the sun S in one axis. The incident parallel solar radiation from the sun S is focussed by the parabolic reflector 11 onto the absorber tube 13. A heat carrier medium, especially water, flows through the absorber tube 13 and is heated by the solar radiation absorbed. At the outlet end of the absorber tube, the heat carrier medium can be withdrawn and sent to an energy consumer or converter.

Figure 2:
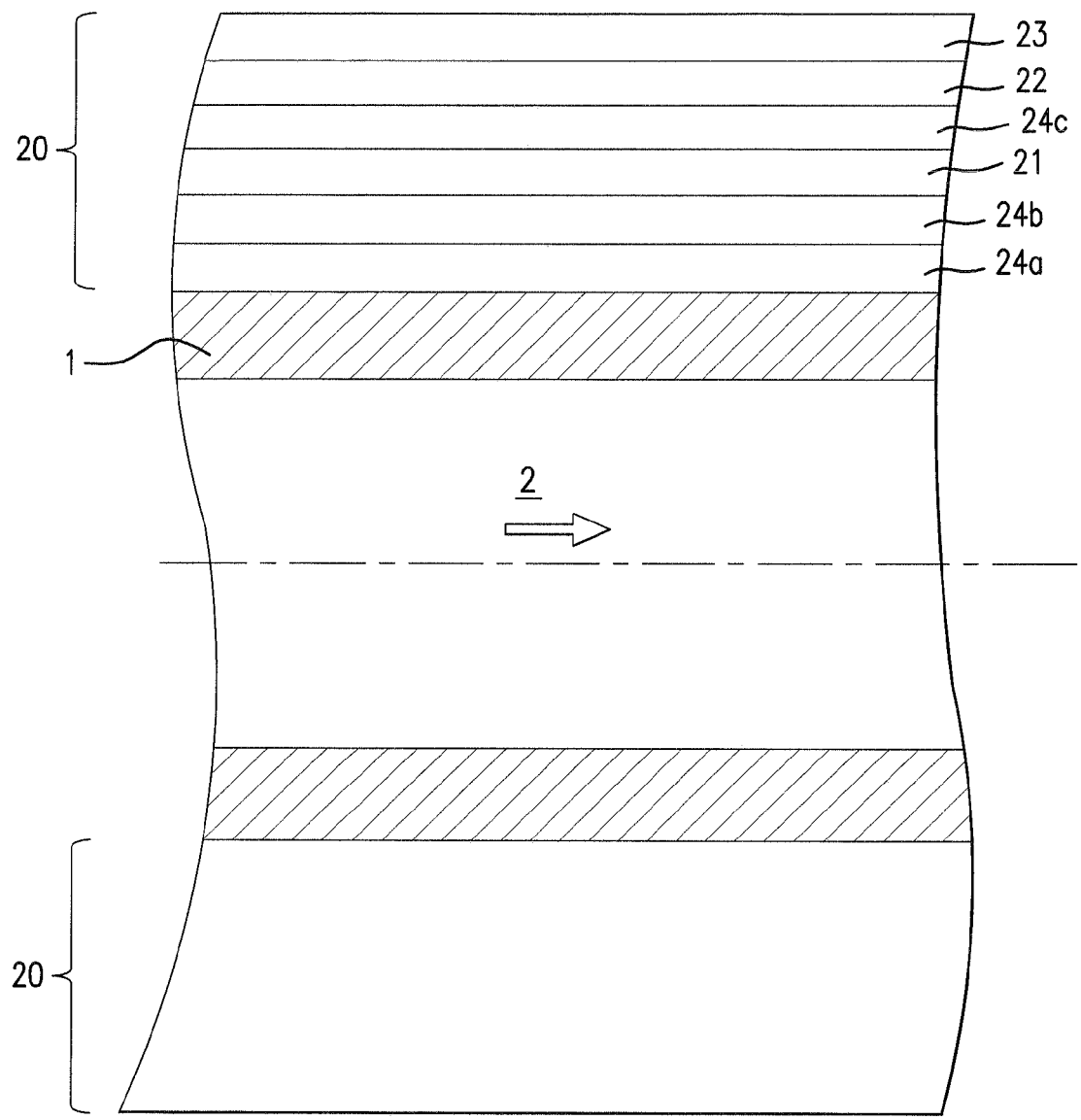
FIG. 2 is a cross-sectional view through an absorber tube according to one embodiment of the invention.

FIG. 2 shows a schematic of a section through an absorber tube 13. The absorber tube 13 has a steel tube 1 through which the heat carrier medium 2 flows and which forms the substrate for the absorber coating 20 applied to the outside of the tube 1. The layer thicknesses of the individual layers of the absorber coating 20 are enlarged for simple illustration and shown with equal thicknesses.

The absorber coating 20 has, from the inside outward (from the inner most layer to the outermost layer), a first barrier or diffusion barrier layer 24a of chromium iron oxide applied to the steel tube 1 by means of thermal oxidation. On this, between a second barrier layer 24b of $SiO_x$, preferably of $SiO_2$, and a third barrier layer 24c, preferably of silicon oxide or aluminium oxide, is embedded a reflective layer 21 that reflects in an infrared region of the spectrum and is composed of gold, silver, platinum or copper. A cermet layer 22 is applied to the third barrier layer 24c, and the layer system is finished on the outside with an antireflection layer 23.

The absorber tube according to the embodiment in FIG. 2 is coated by the process described hereinafter.

The steel tube 1, preferably a stainless steel tube, is polished and then cleaned. The polishing preferably achieves a surface roughness $R_a$ of <0.2 µm. Subsequently, the stainless steel tube is oxidized thermally at a temperature of >400° C. for about half an hour to 2 hours, especially at 500° C. for about 1 hour. This forms an oxide layer of thickness 15 nm to 50 nm, preferably 30 nm±10 nm, as the first barrier layer 24a.

Subsequently, the steel tube is introduced into a vacuum coating system and the system is evacuated. On attainment of a pressure of less than $5\times10^{-4}$ mbar, preferably $1\times10^{-4}$ mbar, the subsequent layers are applied by means of physical gas phase deposition (PVD), especially by means of cathode atomization (sputtering). To this end, the steel tube is moved rotating past sputtering sources, i.e. past targets consisting of the coating substances, for example Al, Ag and Mo.

In the first deposition step, the second barrier layer 24b is applied in the form of a $SiO_x$ layer, by evaporating or atomizing silicon and depositing it reactively with supply of oxygen. In the course of this, an oxygen pressure between $10^{-2}$ mbar and $10^{-3}$ mbar, preferably 4 to $9\times10^{-3}$ mbar, is established. The preferred layer thickness of this second barrier layer is 10 nm to 70 nm and more preferably 30 nm±10 nm.

In the subsequent second deposition step, the reflective layer 21 that reflects in the infrared is applied, by depositing gold, silver, platinum or copper, preferably silver, with a thickness of 60 nm to 150 nm, more preferably of 110 nm±10 nm, onto the second barrier layer 24b.

In the third deposition step, the third barrier layer 24c is applied in the form of a further $SiO_x$ or $Al_xO_y$ layer, by evaporating silicon or aluminium as in the case of the second barrier layer and depositing it reactively with supply of oxygen. The preferred layer thickness of this third barrier layer is not more than 50 nm, more preferably 10 nm±5 nm. However, this barrier layer can also be dispensed with entirely, since it has been found that, given suitable composition of the absorption layer 22 applied to the reflective layer 21, diffusion need not be inhibited by an additional barrier.

In the fourth deposition step, co-evaporation/co-atomization of aluminium and molybdenum from the same crucible or from two separate targets is used to apply the absorption layer or, more specifically in this case, the cermet layer 22. In this step, oxygen is preferably introduced simultaneously into the evaporation/atomization region, in order also to (reactively) deposit aluminium oxide in addition to aluminium and molybdenum.

In the fourth deposition step, the composition can be adjusted differently and even varied in the course of the layer by appropriate selection of the operating parameters (evaporation/atomization rate and amount of oxygen). Especially in the case of use of separate targets, the deposition of the molybdenum component can be configured variably relative to the deposition of the aluminium and/or aluminium oxide component in the absorption layer 22. In other words, the molybdenum component of the absorption layer 22 is configured as a gradient, in which case it is preferably lowered during the application of the absorption layer 22. In the interior, it is preferably 25% by volume to 70% by volume, more preferably 30% by volume to 70% by volume, most preferably 40±15% by volume, and decreases in the outward direction to 10% by volume to 30% by volume, more preferably 20±10% by volume.

Oxygen is preferably added sub-stoichiometrically in relation to the aluminium component deposited, such that a non-oxidized aluminium component remains in the absorption layer 22. This is then available as redox potential or oxygen getter, such that there is no formation of molybdenum oxide. The non-oxidized aluminium component in the absorption layer 22 is preferably below 10% by volume, more preferably between 0 and 5% by volume, based on the overall composition of the absorption layer. The non-oxidized aluminium component can likewise be varied within the absorption layer by altering the operating parameters of evaporation rate and amount of oxygen.

In total, the absorption layer 22 is preferably applied with a thickness of 60 nm to 180 nm, more preferably with a thickness of 80 nm to 150 nm, most preferably at 120±30 nm.

In the fifth deposition step, the antireflection layer 23 is applied in the form of $SiO_2$, by depositing it by means of physical gas phase deposition of silicon with supply of oxygen. The preferred thickness of the antireflection layer 23 thus deposited is 70 nm to 110 nm, more preferably 90±10 nm.

An absorber tube produced in this way was heated at 550° C. in a vacuum heating apparatus for 600 h. The pressure in the vacuum chamber during this heating time was less than $1 \times 10^{-4}$ mbar. After 600 h, the heating was switched off. After the sample had been cooled to below 100° C., the vacuum chamber was vented and the sample was removed. The sample was subsequently analyzed spectrometrically, which determined an integral solar absorption of 95.5%±0.5% for an AM 1.5 direct solar spectrum and the wavelength range of 350-2500 nm. The thermal emission for a substrate temperature of 400° C. was determined to be 7.5%±2%.

PARTS LIST 1 steel tube
2 heat carrier fluid
10 parabolic collector
11 parabolic reflector
12 support structure
13 absorber tube
14 support
20 radiation-selective absorber coating
21 reflective layer which reflects in the infrared region
22 absorption layer
23 antireflection layer
24a first barrier layer
24b second barrier layer
24c third barrier layer While the invention has been illustrated and described as embodied in a radiation-selective absorber coating for an absorber tube of a parabolic collector, an absorber tube with the radiation-selective coating, as well as a process for producing it and to a process for operating a parabolic collector using the absorber tube, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed is new and is set forth in the following appended claims.

We claim:

1. A radiation-selective absorber coating (20) for an absorber tube (13) of a parabolic collector (10), said radiation-selective absorber coating (20) comprising a reflective layer (21) that reflects in an infrared range, at least one absorption layer (22) arranged above the reflective layer (21), and an antireflection layer (23) arranged above said at least one absorption layer (22), said reflective layer (21) being arranged on at least two barrier layers (24a) and (24b);
wherein said at least two barrier layers comprise a first barrier layer (24a) and a second barrier layer (24b);
wherein said second barrier layer (24b) of said at least two barrier layers is arranged between said first barrier layer (24a) and said reflective layer (21) and said second barrier layer (24b) consists of a $SiO_x$ compound, wherein x is from 1 to 2;
wherein said first barrier layer (24a) of said at least two barrier layers consists of an oxide obtained thermally; and
wherein said at least one absorption layer (22) consists of a cermet material.

2. The absorber coating (20) according to claim 1, further comprising a third barrier layer (24c) arranged between said reflective layer (21) and said absorption layer (22).

3. The absorber coating (2) according to claim 2, wherein said third barrier layer (24c) consists of an $Al_xO_y$ compound, x is from 1 to 2, and y is from 1 to 3.

4. The absorber coating (20) according to claim 2, wherein said third barrier layer (24c) consists of a $SiO_x$ compound and x is from 1 to 2.

5. The absorber coating (20) according to claim 1, wherein said reflective layer (21) that reflects in the infrared range comprises gold, silver, platinum, or copper.

6. The absorber coating (20) according to claim 1, wherein said first barrier layer (24*a*) comprises iron oxide.

7. The absorber coating (20) according to claim 1, wherein said cermet material comprises molybdenum and an oxide compound selected from the group consisting of aluminium oxide and zirconium oxide.

8. The absorber coating (20) according to claim 7, wherein said at least one absorption layer is a gradient layer consisting of said cermet material.

9. A radiation-selective absorber coating (20) for an absorber tube (13) of a parabolic collector (10) said radiation-selective absorber coating (20) comprising a reflective layer (21) that reflects in an infrared range, at least one absorption layer (22) arranged above the reflective layer (21), and an antireflection layer (23) arranged above said at least one absorption layer (22), said reflective layer (21) being arranged on at least two barrier layers (24*a*) and (24*b*);
wherein said at least two barrier layers comprise a first barrier layer (24*a*) and a second barrier layer (24*b*);
wherein said second barrier (24*b*) of said at least two barrier layers is arranged between said first barrier layer (24*a*) and said reflective layer (21) and said second barrier layer (24*b*) consists of a $SiO_x$ compound, wherein x is from 1 to 2;
wherein said first barrier layer (24*a*) of said at least two barrier layers consists of an oxide obtained thermally; and
wherein said first barrier layer (24*a*) comprises iron oxide.

10. The absorber coating (20) according to claim 9, wherein said reflective layer (21) that reflects in the infrared range consists of gold, silver, platinum or copper.

11. The absorber coating (20) according to claim 9, wherein said first barrier layer (24*a*) comprises chromium oxide.

12. An absorber tube (13) for a parabolic collector, said absorber tube (13) comprising a steel tube (1) and a radiation-selective absorber coating (20) applied to an exterior of said steel tube (1);
wherein said radiation-selective absorber coating (20) comprises at least one reflective layer (21) that reflects in an infrared range, at least one absorption layer (22) arranged above said at least one reflective layer (21), and an antireflection layer (23) arranged above said at least one absorption layer (22), and at least two barrier layers arranged between said steel tube (1) and said at least one reflective layer (21), of which a first barrier layer (24*a*) applied to the steel tube (1) consists of an oxide obtained thermally and a second barrier layer (24*b*) applied to the first barrier layer (24*a*) consists of a $SiO_x$ compound, wherein x has a value of 1 to 2; and
wherein said first barrier layer (24*a*) comprises iron oxide.

13. The absorber tube (13) according to claim 12, further comprising a third barrier layer (24*c*) arranged between said at least one reflective layer (21) and said at least one absorption layer (22).

14. The absorber tube (13) according to claim 13, wherein said third barrier layer (24*c*) consists of an $Al_xO_y$ compound, x is from 1 to 2, and y is from 1 to 3.

15. The absorber tube (13) according to claim 13, wherein said third barrier layer (24*c*) consists of a $SiO_x$ compound and x has a value of 1 to 2.

16. A process of making an absorber tube (13), said process comprising the steps of:
a) forming a first barrier layer (24*a*) on a steel tube by thermal oxidation, said first barrier layer comprising iron oxide obtained by said thermal oxidation;
b) applying a second barrier layer (24*b*) on the first oxide barrier layer by physical gas phase deposition of silicon with supply of oxygen so that said second barrier layer (24*b*) consists of a $SiO_x$ compound, wherein x=1 or 2;
c) applying a reflective layer (21) that reflects in an infrared range by physical gas phase deposition of gold, silver, platinum, or copper on the second barrier layer (24*b*);
d) applying an absorption layer (22) by simultaneous physical gas phase deposition of aluminium and molybdenum on the reflective layer (21); and
e) applying an antireflection layer (23) by said physical gas phase deposition of said silicon with supply of said oxygen on said absorption layer (22);
whereby said absorber tube comprises said steel tube and a radiation-selective absorber coating (20) applied to an exterior of said steel tube (1);
wherein said radiation-selective absorber coating (20) comprises said reflective layer (21) that reflects in said infrared range, said absorption layer (22) arranged above said reflective layer (21), and said antireflection layer (23) arranged above said absorption layer (22), and said barrier layers arranged between said steel tube (1) and said reflective layer (21), of which said first barrier layer (24*a*) applied to the steel tube (1) consists of an oxide obtained thermally and said second barrier layer (24*b*) applied to said first barrier layer (24*a*) consists of a $SiO_x$ compound, wherein x has a value of 1 to 2; and
wherein said first barrier layer (24*a*) comprises said iron oxide.

17. The process according to claim 16, further comprising polishing said steel tube to a surface roughness of $R_a<0.2$ μm prior to said thermal oxidation to form said first oxide barrier layer (24*a*).

18. The process according to claim 16, wherein said physical gas phase deposition is carried out at an ambient pressure of less than $5\times10^{-4}$ mbar.

19. The process according to claim 16, wherein the steel tube, during said physical gas phase deposition, is moved rotating past targets comprising substances to be applied in each case.

20. The process according to claim 16, further comprising applying a third barrier layer (24*c*) by said physical gas phase deposition of said aluminium or said silicon with supply of said oxygen after application of the reflective layer (21) that reflects in the infrared range.

21. The process according to claim 16, wherein said aluminium in said absorption layer (22) is deposited with supply of said oxygen.

22. The process according to claim 16, wherein deposition of said molybdenum is configured variably relative to deposition of said aluminium or an aluminium oxide component during said physical gas phase deposition of the absorption layer (22).

23. A process of operating a parabolic collector with an absorber tube through which a heat carrier medium (2) is passed, wherein the absorber tube (13) has a radiation-selective absorber coating (20) and said radiation-selective absorber coating comprises a reflective layer (21) that reflects in an infrared range, at least one absorption layer (22) arranged above the reflective layer (21), and an antireflection layer (23) arranged above said at least one absorption layer (22), said reflective layer (21) being arranged on at least two barrier layers (24a) and (24b);

wherein said at least two barrier layers comprise a first barrier layer (24a) and a second barrier layer (24b); and wherein said second barrier layer (24b) of said at least two barrier layers is arranged between said first barrier layer (24a) and said reflective layer (21) and said second barrier layer (24b) consists of a $SiO_x$ compound, wherein x is from 1 to 2; and wherein said first barrier layer (24a) of said at least two barrier layers consists of an oxide obtained thermally, said first barrier layer (24a) comprising iron oxide;

wherein said process comprises the step of adjusting an operating temperature of the absorber tube (13) to 400° C. to 550° C.

* * * * *